T. J. MAYELL.
MACHINE FOR MAKING RUBBER HOSE.
No. 28,288. Patented May 15, 1860.
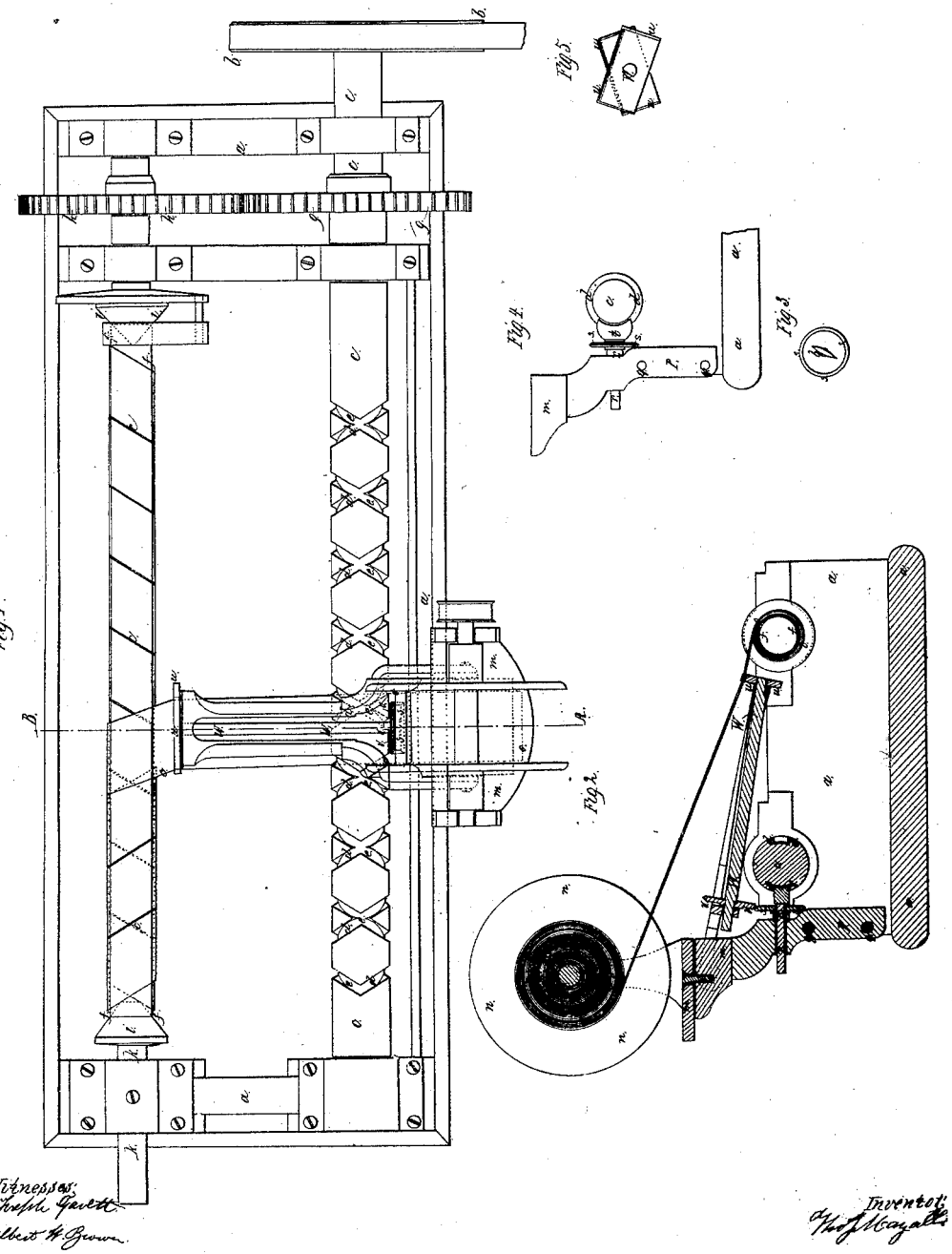

UNITED STATES PATENT OFFICE.

THOMAS J. MAYALL, OF ROXBURY, MASSACHUSETTS.

MACHINE FOR MAKING RUBBER HOSE.

Specification of Letters Patent No. 28,288, dated May 15, 1860.

*To all whom it may concern:*

Be it known that I, THOMAS J. MAYALL, of Roxbury, in the county of Norfolk and State of Massachusetts, have invented a new and useful Machine for Making India-Rubber and Gutta-Percha Hose and Tubing, and that the following description, taken in connection with the accompanying drawings, hereinafter referred to, forms a full and exact specification of the same, wherein I have set forth the nature and principles of my improvements by which my invention may be distinguished from all others of a similar class, together with such parts as I claim and desire to have secured to me by Letters Patent.

The figures of the accompanying plate of drawings represent my improvement.

Figure 1 is a plan or top view of my improved machine. Fig. 2 is a transverse, vertical section taken in plane of line A, B, Fig. 1. Figs. 3, 4, and 5 are detail views of different parts of the machine.

The ordinary straight seamed gutta percha or india rubber hose or tubing consists simply of cloth covered with coatings of vulcanized rubber or gutta percha, wound upon a mandrel and then cured in ovens or heaters. But by this mode of forming the hose, a straight seam is left, which is ruptured when the hose is subjected to great strain. For this reason, spiral hose or tubing, which consists of cotton cloth or other fabric covered with a coating of rubber or gutta percha wound spirally upon a mandrel in overlapping layers, running in opposite directions and afterward vulcanized, has been preferred as no seam occurs in it and the hose or tubing is much stronger in consequence of the fibers of the duck or other fabric used, crossing and ovelapping each other whereby the strain or pressure upon the hose or tubing is received and borne equally throughout its entire circumference. The objection to the use of spiral hose or tubing, has been the great cost and tediousness of its manufacture, as previous to my invention it has been made entirely by hand and consequently could be produced only slowly and in a very imperfect manner.

The present invention has for its object the making of spiral rubber or gutta percha hose or tubing by machinery, whereby it can be much more rapidly and accurately formed than by hand.

The most essential feature of my new machine consists in giving such an automatic motion to a carriage containing a roll upon which is wound the fabric coated with rubber or gutta percha, as to wind rapidly and accurately the said fabric in overlapping spiral layers, or in contiguous spiral layers, or in layers running in opposite directions, upon a suitable mandrel, upon which, when it has received a sufficient number of layers, the hose or tubing is vulcanized in an oven or heater.

*a a a a* in the drawings represent the supporting framework of the machine.

*b b* is the driving wheel fixed to the long main shaft *c c* upon which is cut a double endless screw consisting of two spiral grooves *d* and *e* running in opposite directions to each other.

*f f* is a mandrel made to revolve by means of two gears *g* and *h* and secured at one end by means of a dog *i* to a short shaft *k*, the other end turning upon a fixed conical shaped center *l*, so that the mandrel can be removed by slipping off the dog *i*.

*m m* is a carriage carrying a reel *n* upon which is wound the cotton or other fabric *o o*, coated with rubber or gutta percha of which the hose or tubing is to be made.

Any desired amount of tension is brought to bear upon the fabric by means of friction brought to bear in any proper manner upon the shaft of the reel *n*. Through the lower portions *p* of the carriage *m m*, which runs upon and is supported by the rails or ways *q, q,* extends a short shaft *r* attached to which, is a pinion *s* and a spur *t*, which fits into the grooves *d* and *e*, of the endless screw shaft, which by its revolution, thereby causes the carriage *m m* to travel back and forth across the machine receiving a reciprocating rectilinear motion. It will be seen that the two spiral grooves *d* and *e* merge into one another at the ends of the screw shaft, so as to form one contiguous groove at those points, and as the spur shaft *r* is free to turn the spur *t*, on arriving at one end of the spiral groove *d*, will then travel into the spiral groove *e* running in the opposite direction and thus the carriage *m m*, carrying of course the reel *n*, and the fabric

*o o*, will receive the required motions. The fabric *o o* of which the hose or tubing is to be composed is passed from the reel *n* to the mandrel *f f* upon which it is to be spirally wound through a guide *u* which is inclined at the proper angle to impart the desired spiral direction to the fabric.

By means of a pinion *v* which engages with the pinion *s* before referred to, the guide *u* which is attached to the long shaft *w* extending through the pinion *v*, after it has guided the fabric spirally in one direction across the mandrel, is turned into an opposite direction, as shown in the drawings, so as to guide the fabric in the reverse spiral direction, when the carriage travels back, as the turning of the spur shaft *r* when the spur *t* arrives at either end of the spiral endless screw, will partially revolve the pinions *s* and *v* and thereby set the guide *u* at an opposite angle from that which it previously occupied.

From the foregoing description it will be seen that the respective movements and operations of the traveling carriage *m*, the guide *u* and the mandrel *f* will effectually accomplish the desired result, viz: the rapid and accurate formation upon a mandrel of a spiral hose.

In place of the single reel carrying the fabric, two or more reels can be placed upon the same carriage, in which case in some kinds of hose it is unnecessary to return the carriage to cross the layers. And it is obvious that in place of the screw upon which the carriage is made to travel, other mechanical devices may be used for imparting the desired motions to the carriage, such as a rack and gear and endless chain, &c.

Having thus described my improved and new machine, I shall state my claims as follows:

What I claim as my invention and desire to have secured to me by Letters Patent, is—

1. An organized machine for the formation of spiral rubber or gutta percha hose or tubing, the same consisting essentially of a traveling carriage, carrying the fabric, of which the hose or tubing is to be formed, and a reversible guide to which such automatic motions are given as to wind the said fabric in spiral layers, upon a suitable mandrel, substantially as set forth.

2. In a machine for making spiral rubber or gutta percha hose, I claim the combination of the traveling carriage carrying the fabric of which the hose is to be formed and made to receive a reciprocating rectilinear motion in any proper manner, with the reversible guide, the two so operating together, that the said guide shall be reversed in position, as soon as the fabric is wound spirally in one direction upon the mandrel, whereby the fabric is fed along and guided in two opposite directions upon the mandrel, so as to form spiral layers, crossing each other, as set forth.

3. In a machine organized for the formation of spiral rubber or gutta percha hose or tubing, I claim the combination of the traveling carriage carrying the supplying reel, and the mandrel upon which the hose is to be wound, as set forth.

THOS. J. MAYALL.

Witnesses:
ROBT. L. HARRIS,
ALBERT W. BROWN.